Aug. 2, 1938. D. C. ABDELNOUR Re. 20,813

WIPER

Original Filed May 18, 1934

INVENTOR
DMITRI C. ABDELNOUR
BY
Howell & Sherwood & Safford
ATTORNEYS

Reissued Aug. 2, 1938

Re. 20,813

UNITED STATES PATENT OFFICE 20,813

WIPER

Dmitri C. Abdelnour, Port Chester, N. Y., assignor, by mesne assignments, to Sleetex Company, New York, N. Y., a corporation of New York Original application No. 2,009,377, dated July 30, 1935, Serial No. 726,259, May 18, 1934. Application for reissue September 22, 1936, Serial No. 101,919½

10 Claims. (Cl. 15—250)

This invention relates to a wiper for sleet, frost and the like, and especially to a wiper adapted for use in automatic window or windshield clearing devices.

The coating of glass and other windows and windshields with sleet, frost, etc., has, prior to my invention, been an unending source of trouble. During a sleet storm the windshield of an automobile may become so completely covered with a film of ice as to totally obscure all visibility. The ordinary windshield wiper is ineffective to cure this condition. The ice freezes solidly to the surface of the windshield and the wiper merely rubs over the surface of the ice.

The most common cure for this condition in the past has been some kind of heater. Thus various electrical resistance heaters have been designed and manufactured and have gone into extensive use for raising the temperature of the glass sufficiently so that the windshield wipers can scrape away ice from a portion at least of the glass. Also, it is not at all uncommon during a sleet storm to see drivers with a row of lighted candles behind their windshields. While these heating devices are more or less effective to remove the ice, they are seriously objectionable in other ways. Not infrequently the localized heating results in cracking of the glass, and especially in the case of so-called safety glass, which is laminated with an organic binder between the layers of inorganic glass, the binder may be decomposed or softened by the heat with a resulting separation or discoloration which permanently disfigures the windshield if it does not render it wholly useless.

It is an object of my present invention to provide a device which will effectively remove sleet, frost, etc., from glass or other surfaces without the slightest danger of injury thereto. Another object of my invention is to provide an extremely simple device which can easily be carried in the pocket of one's car or under the seat, or purchased at any store or service station for a few cents, and which can be instantaneously installed when the need arises.

With these and other objects in view, my invention contemplates the substitution for the ordinary squeegee of an ordinary windshield or window wiper, a pad having a pervious sheet facing holding within it a supply of water-soluble anti-freeze material. This pad may be moved by the ordinary windshield wiper mechanism back and forth over the surface of the glass. If any ice adheres to the glass, it passes under the face of the pad and is subjected to the dissolving action of the film of anti-freeze solution which adheres to the face of the pad. Thus any ice which may form within the scope of the movement of the wiper is promptly dissolved and flows out of the line of vision as an anti-freezing solution.

I am aware that prior to my invention various suggestions have been made with a view to applying anti-freeze materials to the surface of a glass to prevent frosting or the formation of ice thereon. With very few exceptions, however, these have been complicated devices which required substantial time and expense for installation. Experience has shown that such devices are never available in time when they are seriously needed. My invention, therefore, is an improvement upon such devices which because of its simplicity, offers a complete and practical solution of a problem which has never been solved by the more complicated devices known to the prior art.

In the accompanying drawing I have shown, by way of example and solely for the purpose of illustrating the accompanying description and without intention in any way to limit the scope of my invention, a preferred embodiment of my invention.

Figure 1:
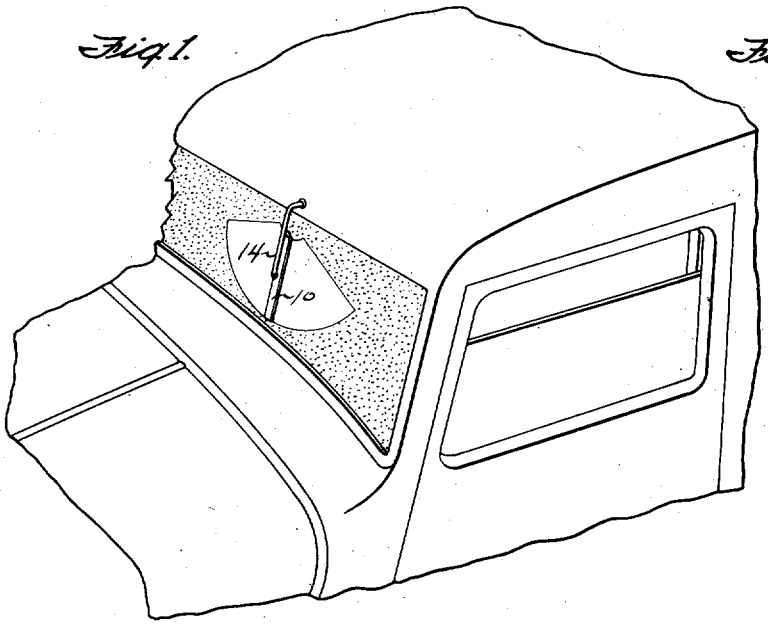
Figure 1 is a perspective view of a portion of an automobile showing the wiper mounted according to my invention.
Figure 2:
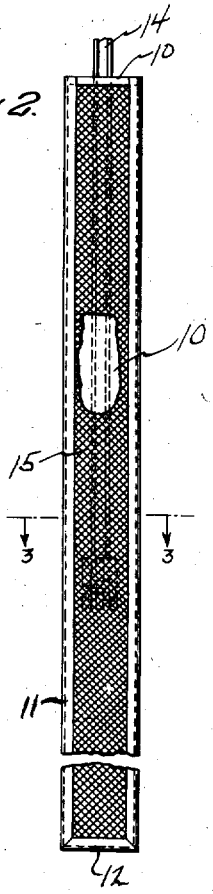
Figure 2 is a plan view, partially broken away, of a wiper according to my invention.
Figure 3:
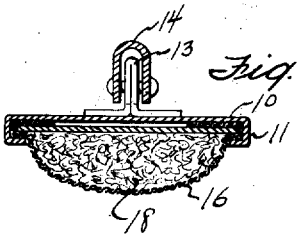
Figure 3 is a cross-section taken on line 3—3 of Figure 2.
Figure 4:
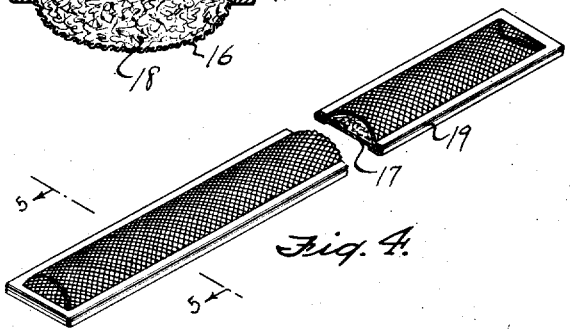
Figure 4 is a perspective view of a filler removed from the holder shown in Figures 1 and 2.
Figure 5:
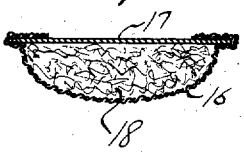
Figure 5 is a cross-section taken on line 5—5 of Figure 4.

Referring to the drawing, the embodiment of the invention there illustrated consists essentially of a holder 10, having three of its edges 11 and 12 left over for the reception of a wiper pad 15. On the back of this holder 10 is a standard connection member 13, which, in the present instance, consists of a hook member adapted to engage the motor arm 14.

The wiper pad 15 is, in the present instance, constructed of a facing 16, of cheap material which is pervious to a solution of the anti-freeze material, a backing 17 of relatively stiff material, and a filling 18 of water-soluble anti-freeze material. The facing material 16, in this case, is secured to the back of the backing 17 so as to form an enclosed space for the filling 18. The edges 19 are preferably made smooth in some manner, either by pressing or molding thereover a coating of some thin material, or merely by pressing them down and securing them to the backing by the same adhesive which was used to secure the ends under the backing 17. In this way the pad is made capable of slipping under the edges 11 and 12 more easily than if the edges of the pad were not smoothed down in some such way.

The facing material used may be a textile material or it may be a felted fiber material. In either case, I have found it advantageous to reduce somewhat its permeability, for example, by impregnating it with a material which reduces the interstices through which the dissolved material may pass, but which does not render the sheet so repellent to water that substantial solution would not occur. In the case of a felted fibrous material, e. g. a paper sheet, the desired results may be obtained by means of a thin adhesive coating on the fibers and a limited pressure to obtain the desired size of interstices. For this purpose I prefer to use a partially hydrated paper pulp and to form it into a semi-parchment paper which is permeable to the solution of anti-freeze material, but which will permit it to pass only at a substantially lower rate than would a similar paper of non-hydrated cellulose.

The anti-freeze material used may vary widely. It will be understood readily by those skilled in the art that the purpose may be served by any water-soluble material which is non-corrosive to the glass or other materials with which it will come in contact, and which can be held within the facing material 16. It is preferable, however, to use a material which is not too readily soluble so that it can be relied upon to last throughout a storm. I have also found it advantageous to use such material in a form adapted to yield somewhat so that the pad can adjust itself to irregularities of the surface. For this purpose I have found it most advantageous to use a pulverized solid in combination with a viscous liquid, the latter serving as a binder for the former and giving a more or less plastic cake of anti-freeze material. The combination which I have found best suited for this purpose is ordinary salt (sodium chlorid) and glycerine. The amount of glycerine being just enough to hold the sodium chlorid together in a plastic mass.

While I have disclosed above and in the accompanying drawing a preferred embodiment of my invention, it is to be understood that numerous modifications and changes can be made. For example, it is not essential that the holder and pad be made in two separate pieces. It is entirely possible to make these in such cheap construction that the entire combination can be thrown away after the storm and replaced at the next storm. In such case, the backing 17 and the holder 10 will be combined in a single member. The backing 17 may also be dispensed with in the pad and a more rigid filling material may be used or the holder designed to engage the pad without such backing.

It is to be understood also that my invention is applicable to many uses other than automobiles. For example, gauge glasses and sight glasses in chilled apparatus where frosting is likely to occur and on windows of refrigerators or show windows during extremely cold temperatures. These other uses and modifications are suggested only to illustrate the scope of my invention and it is to be understood that many others are contemplated and are within the scope of my annexed claims.

I claim:

1. A wiper for sleet, frost and the like, comprising means including an arm which reciprocates in a plane close to and substantially parallel with the surface to be wiped and exerts pressure thereagainst and a thawing pad removably secured to said arm which comprises a stiff pressure-distributing back having one side thereof approximately flat, said back having its edges turned back and crimped upon the facing hereinafter specified to form securing means for the facing, said facing being of water-pervious sheet material and having its edges secured to the backing by said crimped edges so as to enclose a substantial space between them which is not substantially wider than the back, and a supply of water-soluble anti-freeze material held in said space.

2. A wiper for sleet, frost, and the like, which comprises a stiff pressure distributing back having one side thereof approximately flat, and a facing which is to contact the surface to be wiped, the edges of said back being turned back upon itself over said facing to provide securing means for said facing to said back, means on the back adapted to connect it to a wiper arm of a mechanical wiper mechanism for movement thereby in a lateral direction and pressure thereby against the surface being wiped, the facing being a water-pervious sheet material secured at its edges to said securing means and being extended across the face thereof with sufficient slack to enclose a substantial space between it and said back, which space is not substantially wider than the back, and a supply of water-soluble anti-freeze material held in said space.

3. A wiper as defined in claim 2 in which the anti-freeze material comprises finely divided salt bonded with glycerine.

4. A wiper for sleet, frost and the like which comprises a stiff, approximately flat pressure-distributing back, means on the back adapted to connect it to a wiper arm of a mechanical wiper mechanism for movement thereby in a lateral direction and pressure thereby against the surface being wiped, a facing of water-pervious sheet material secured at its edges to the back and extended across the face thereof with sufficient slack to enclose a substantial space therebetween which is not substantially wider than the back, and a supply of water-soluble anti-freeze material held in said space, said water-pervious material being a felted fibrous material with the fibers thereof cemented together by a waterproof binder which reduces the permeability of the sheet to dissolve substances and thereby slows down the rate of solution of the anti-freeze material.

5. A wiper for sleet, frost and the like which comprises a stiff, approximately flat pressure distributing back, means on the back adapted to connect it to a wiper arm of a mechanical wiper mechanism for movement thereby in a lateral direction and pressure thereby against the surface being wiped, a facing of water-pervious sheet material secured at its edges to the back and extended across the face thereof with sufficient slack to enclose a substantial space therebetween which is not substantially wider than the back, and a supply of water-soluble anti-freeze material held in said space, said water pervious material being a fibrous sheet impregnated with a waterproof material which reduces the interstices through which water may pass without altogether repelling passage of water and the dissolved anti-freeze material therethrough.

6. A wiper for sleet, frost and the like which comprises a stiff, approximately flat pressure distributing back, means on the back adapted to connect it to a wiper arm of a mechanical wiper mechanism for movement thereby in a lateral direction and pressure thereby against the surface being wiped, a facing of water-pervious sheet material secured at its edges to the back and extended across the face thereof with sufficient slack to enclose a substantial space therebetween which is not substantially wider than the back, and a supply of water-soluble anti-freeze material held in said space, said water-pervious material being paper, the cellulose of which has been partially hydrated so that the fibers are cemented together, thereby and the permeability of the sheet reduced.

7. A wiper for sleet, frost and the like, which comprises a facing of water-pervious material secured at its edges to a stiff pressure distributing back having a substantially flat side so as to form over the flat side thereof a bag not substantially wider than said back, said facing material being extended across the side of the back with sufficient slack to enclose a substantial space between it and the back, a supply of water soluble anti-freeze material contained in said bag, the stiff pressure distributing back having its flat side adapted to exert pressure on the supply of soluble anti-freeze material, means for securing the bag at its edges to hold the bag and the supply of anti-freeze material therein securely positioned over the back, and connecting means on the back adapted to connect it to a wiper arm of a mechanical wiper mechanism for transmission of force from the arm to the back in a lateral direction for moving the wiper laterally and in a direction toward the surface being wiped for maintaining the supply of water soluble material and the facing under pressure between said surface and the back.

8. A wiper for sleet, frost and the like, comprising motor means including an arm which reciprocates in a plane close to and substantially parallel with the surface to be wiped and exerts pressure thereagainst and a thawing pad removably secured to said arm which comprises an approximately flat stiff pressure-distributing back, said back having its edges turned inwardly and crimped to form securing means for a facing, a facing of water-pervious sheet material having its edges secured to the backing by said securing means so as to enclose a substantial space between them which is not substantially wider than the back, and a supply of water-soluble anti-freeze material held in said space.

9. A wiper for sleet, frost and the like, which comprises a stiff, approximately flat pressure distributing back, said back having its edges turned inwardly and crimped to form securing means for a facing, means on the back adapted to connect it to a wiper arm of a mechanical wiper mechanism for movement thereby in a lateral direction and pressure thereby against the surface being wiped, a facing of water-pervious sheet material secured at its edges to said securing means and extended across the face thereof with sufficient slack to enclose a substantial space therebetween which is not substantially wider than the back, and a supply of water-soluble anti-freeze material held in said space.

10. A wiper, as defined in claim 9, in which the anti-freeze material comprises finely divided salt bonded with glycerine.

DMITRI C. ABDELNOUR.